(12) United States Patent
Peters

(10) Patent No.: US 12,122,270 B2
(45) Date of Patent: Oct. 22, 2024

(54) DEVICE AND METHOD FOR OPERATING A SEAT ARRANGEMENT THAT CAN BE FOLDED OUT OF OR INTO A VEHICLE

(71) Applicant: MERCEDES-BENZ GROUP AG, Stuttgart (DE)

(72) Inventor: Steven Peters, Schwieberdingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 386 days.

(21) Appl. No.: 17/786,597

(22) PCT Filed: Dec. 3, 2020

(86) PCT No.: PCT/EP2020/084391
§ 371 (c)(1),
(2) Date: Jun. 17, 2022

(87) PCT Pub. No.: WO2021/122018
PCT Pub. Date: Jun. 24, 2021

(65) Prior Publication Data
US 2023/0028999 A1    Jan. 26, 2023

(30) Foreign Application Priority Data
Dec. 19, 2019   (DE) .................. 10 2019 008 843.3

(51) Int. Cl.
*B60N 2/30* (2006.01)
*B60N 2/02* (2006.01)

(52) U.S. Cl.
CPC ......... *B60N 2/3095* (2013.01); *B60N 2/0224* (2013.01); *B60N 2/3031* (2013.01)

(58) Field of Classification Search
CPC .. B60N 2/3095; B60N 2/0224; B60N 2/3031; B60N 2/0237; B60N 2230/20; B60N 2/0244; B60N 2/3065; B60R 25/24
See application file for complete search history.

(56) References Cited

U.S. PATENT DOCUMENTS

| | | |
|---|---|---|
| 1,751,378 A | 3/1930 | Zaiden |
| 4,139,232 A | 2/1979 | Cerf et al. |
| 6,820,913 B2 | 11/2004 | Macey et al. |
| 7,579,791 B2 | 8/2009 | Nakashima et al. |
| 10,647,222 B2 | 5/2020 | Demirovic et al. |

(Continued)

FOREIGN PATENT DOCUMENTS

| | | |
|---|---|---|
| CN | 101097655 A | 1/2008 |
| CN | 103747106 A | 4/2014 |

(Continued)

OTHER PUBLICATIONS

English translation of DE 1020152019059 A1 (Year: 2017).*

(Continued)

*Primary Examiner* — Lori Lyjak
(74) *Attorney, Agent, or Firm* — PATENT PORTFOLIO BUILDERS PLLC

(57) ABSTRACT

A device for operating a seating arrangement that can be folded out of or into a vehicle. Includes a control unit that receives and executes an activation command by an authorized vehicle user and third parties for folding the seating arrangement out of a region inside the vehicle into a region accessible from outside the vehicle.

10 Claims, 4 Drawing Sheets

(56) References Cited

U.S. PATENT DOCUMENTS

Figure 1:
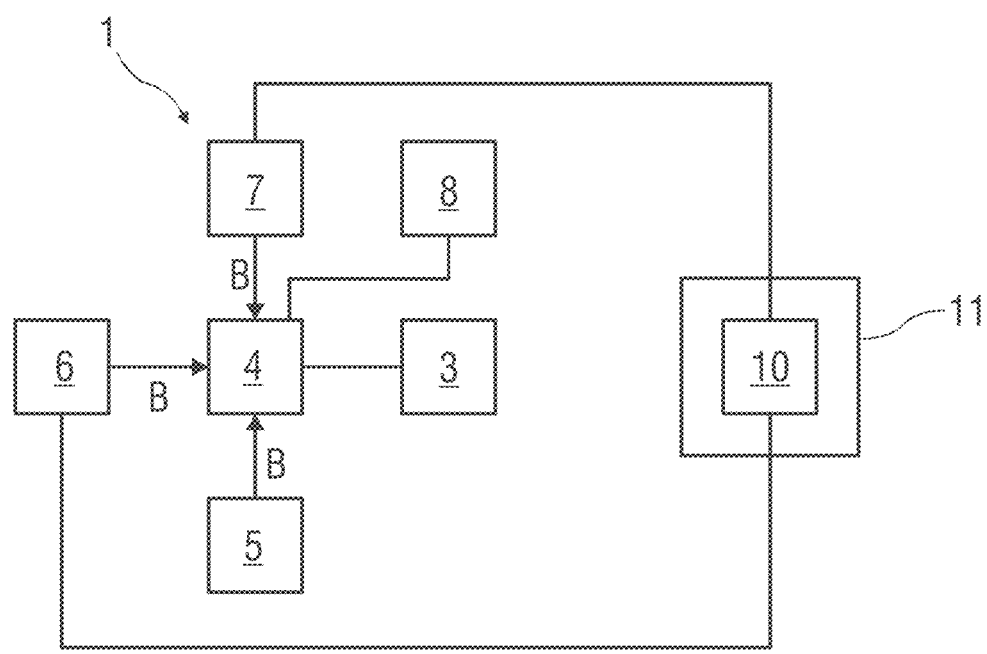

2004/0183329 A1 9/2004 Macey et al.
2008/0001565 A1 1/2008 Nakashima et al.

FOREIGN PATENT DOCUMENTS

| CN | 104918212 A | 9/2015 | |
|---|---|---|---|
| CN | 106296914 A | 1/2017 | |
| CN | 110356298 A | 10/2019 | |
| DE | 10239199 B4 * | 5/2006 | ............. B60N 2/305 |
| DE | 102007023649 A1 | 1/2008 | |
| DE | 102013004612 B4 | 11/2016 | |
| DE | 102015219059 A1 | 4/2017 | |
| DE | 102016218071 A1 | 3/2018 | |
| EP | 2033839 A1 * | 3/2009 | ............. B60N 2/305 |
| GB | 2523822 A | 9/2015 | |
| JP | 2018521891 A * | 8/2018 | |
| WO | WO-2009009316 A1 * | 1/2009 | ............. B60R 25/24 |

OTHER PUBLICATIONS

Office Action dated Mar. 14, 2024 in related/corresponding Chinese Application No. 202080087223.X.
International Search Report mailed Mar. 12, 2021 in related/corresponding International Application No. PCT/EP2020/084391.
Office Action created Apr. 20, 2020 in related/corresponding DE Application No. 10 2019 008 843.3.
Written Opinion mailed Mar. 12, 2021 in related/corresponding International Application No. PCT/EP2020/084391.

* cited by examiner

DEVICE AND METHOD FOR OPERATING A SEAT ARRANGEMENT THAT CAN BE FOLDED OUT OF OR INTO A VEHICLE

BACKGROUND AND SUMMARY OF THE INVENTION

Exemplary embodiments of the invention relate to a device for operating a seat arrangement that can be folded out of or into a vehicle, to a method for operating a seat arrangement that can be folded out of or into a vehicle, and to a vehicle having a device for operating a seat arrangement that can be folded out of or into a vehicle.

A seat that can be folded out for motor vehicles is known from EP 2 033 839 A1, the motor vehicles being provided with an access floor in a trunk and a loading edge. The access floor of the trunk can be folded out of the trunk in a rear region and, after being folded out, is supported on the loading edge. A padded sitting surface is formed on a side of the access floor directed upwards in the folded out state.

Exemplary embodiments of the invention are directed to a novel device and a novel method for operating a seating arrangement that can be folded out of or into a vehicle and an improved vehicle in comparison to the prior art.

According to embodiments of the invention, the device for operating a seating arrangement that can be folded out of or into a vehicle comprises a control unit, which is formed to receive and carry out an activation command from an authorized vehicle user and third parties for folding the seating arrangement out of a region inside the vehicle into a region accessible from outside the vehicle.

The device makes it possible to provide a comfortable seating option, for example for changing shoes and/or for relaxing, even for third parties who are not authorized vehicle users.

In a possible design of the device, it comprises at least one electronic vehicle key, comprising a function for enabling an operation of the seating arrangement by third parties, and/or at least one mobile terminal, comprising an application program for enabling an operation of the seating arrangement by third parties. In doing so, it is possible for the vehicle user to enable it easily, comfortably, and safely.

In a further possible design of the device, it comprises at least one mobile terminal, comprising an application program for operating the seating arrangement by third parties. In doing so, a simple, comfortable, and safe operation by the third party is possible.

In the method for operating a seating arrangement that can be folded out of or into a vehicle, a folding-out function of the seating arrangement from a region inside the vehicle into a region accessible for third parties from the outside of the vehicle is enabled after being correspondingly enabled by an authorized vehicle user.

The method makes it possible to provide a comfortable seating option, for example for changing shoes and/or for relaxing, even for third parties who are not authorized vehicle users.

In a possible design of the method, enabling is only activated or can only be activated when it is recorded by a camera and/or the authorized vehicle user confirms that a trunk, in which the seating arrangement in the folded-in state is located, is free of other objects. Thus, a danger of theft of objects from the trunk can be reduced.

In a further possible design of the method, locations of vehicles, which comprise a seating arrangement that can be operated by third parties by means of the application program and is ready for operation and can be folded out, are output by means of an application program on at least one mobile terminal at least of a third party. Thus, third parties can easily find vehicles which offer the function of a seating arrangement for third parties that can be folded out.

In a further possible design of the method, each operation of the seating arrangement carried out by a third party is saved together with a corresponding geographical position of the vehicle present at the point in time of operation in a central memory unit. Thus, in the event of damage, vandalism, and/or theft of objects from the vehicle, traceability is ensured.

In a further possible design of the method, when the third party leaves the predetermined perimeter around the vehicle without previously folding in the seating arrangement, an alarm is output on the mobile terminal by means of the application program and, in the event of the third party not reacting, the seating arrangement is automatically folded in. This ensures that the seating arrangement is always folded back in after having been used and the vehicle is locked. A geographical position of the third party is here, for example, ascertained by means of a mobile end terminal, on which the application program is carried out. A geographical position of the vehicle is ascertained, for example, by means of a position determination sensor specific to the vehicle, for example a so-called GPS sensor.

A vehicle according to the invention having a seating arrangement that can be folded out can be operated by means of a device described above. The vehicle makes it possible to provide a comfortable seating option, for example for changing shoes and/or for relaxing, even for third parties who are not authorized vehicle users. Since parked vehicles often take up valuable surface area, for example in a city center, an adequate equivalent or added value can be generated by offering a comfortable seating opportunity which is optionally found in the shade below an open trunk lid.

According to the invention, a vehicle according to the invention, in particular a saloon car, having a seating arrangement that can be folded out of or into a trunk is characterized in that the seating arrangement comprises at least one leaning element and at least one seating element arranged on the leaning element. The at least one leaning element runs at least substantially towards and below an inner wall delimiting the trunk on an upper side in a folded-in state. In a folded-in state of the seating arrangement, the at least one seating element runs at least substantially in parallel to an inner wall delimiting the trunk of a passenger cell. The at least one leaning element and the at least one seating element can be pivoted out of the folded-in state into a folded-out state, wherein the at least one leaning element in the folded-out state runs at least substantially in parallel to a vertical axis of the vehicle inside the trunk and the at least one seating element in the folded-out state runs starting from a lower end of the folded-out state at least up to a loading edge of the trunk at least substantially perpendicularly to the vertical axis of the vehicle.

Due to this arrangement of the seating arrangement in the folded-in state, the vehicle is characterized by a particularly large remaining volume of the trunk and a good usability thereof. Furthermore, providing a comfortable seating possibility, for example for changing shoes and/or for relaxation, can be implemented by means of the vehicle.

BRIEF DESCRIPTION OF THE DRAWING FIGURES

Exemplary embodiments of the invention are explained in more detail below by the drawings.

Figure 2:
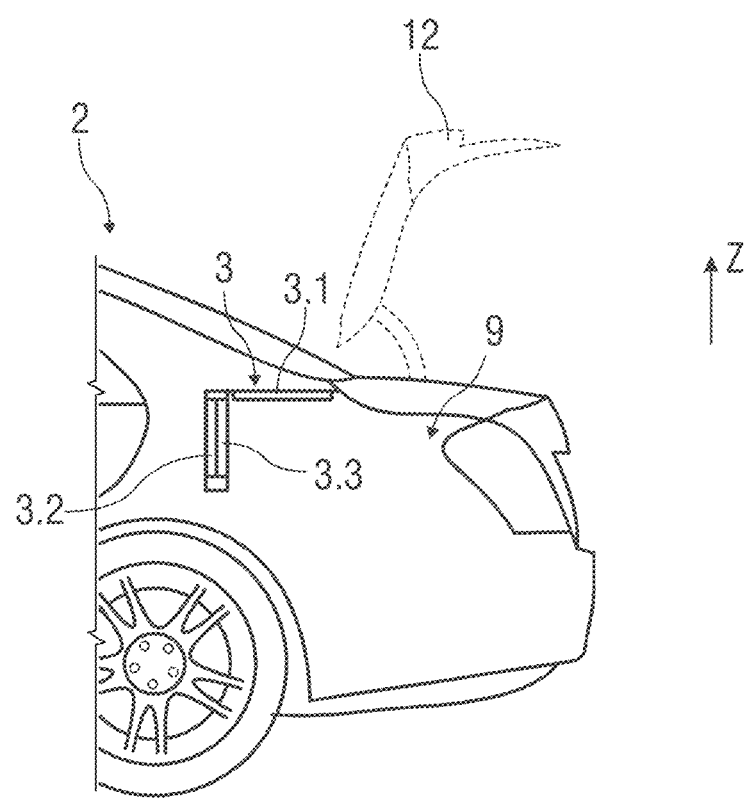
Figure 3:
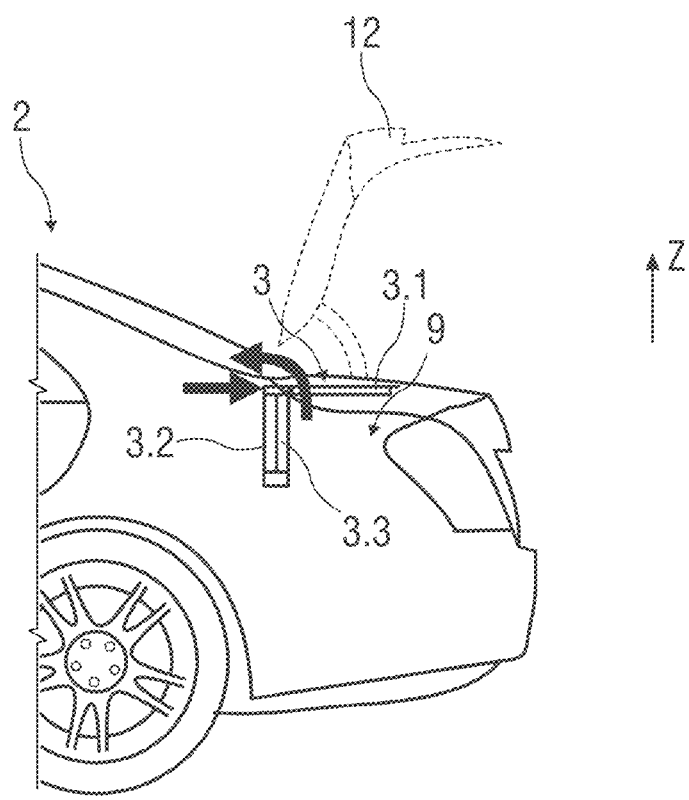
Figure 4:
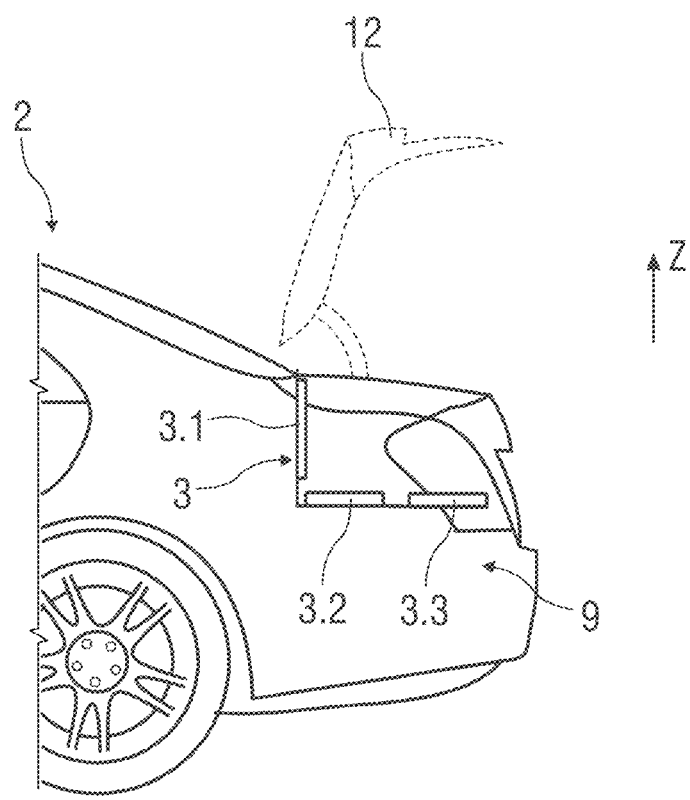

Here are shown:

FIG. 1, schematically, a block wiring diagram of a device for operating a seating arrangement that can be folded out of or into a vehicle, FIG. 2, schematically, a semi-transparent side view of a cut-out of a vehicle with a seating arrangement that can be folded out in the vehicle in a first position, FIG. 3, schematically, a semi-transparent side view of a cut-out of a vehicle with a seating arrangement in a second position, and FIG. 4, schematically, a semi-transparent side view of a cut-out of a vehicle with a seating arrangement that can be folded out in the vehicle in a third position.

Parts corresponding to one another are provided with the same reference numerals in all figures.

DETAILED DESCRIPTION

In FIG. 1, a block wiring diagram of a possible exemplary embodiment of a device 1 for operating a seating arrangement 3 that can be folded out of or into a vehicle 2 shown in FIGS. 2 to 4 is depicted.

The seating arrangement 3 is formed, in particular, in such a way that it is transferred automatically and in a motorized manner from a folded-in position into a folded-out position.

Here, the seating arrangement 3 in the folded-out state forms a comfortable seating opportunity, for example for changing shoes and/or as a relaxation possibility for a vehicle user. In addition, this function is also available to third parties, for example passers-by.

To do so, the device 1 comprises a control unit 4, which is formed to receive and carry out an activation command B by an authorized vehicle user and third parties to fold the seating arrangement 3 out of a region inside the vehicle into a region accessible from outside the vehicle 2.

The authorized vehicle user can trigger the activation command B by means of an electronic vehicle key 5 or by means of an application program of a mobile terminal 6, for example a smartphone or a so-called wearable.

The third party can optionally trigger the activation command B by means of an application program of a mobile terminal 7, for example a smartphone or so-called wearable.

This means that the operation is carried out by the authorized vehicle user by means of their vehicle key 5 or by means of their mobile terminal 6, wherein the authorized vehicle user can predetermine, for example, in the application program of the mobile terminal 6 but also locally in the vehicle 2 itself, as to whether they permit a use of the seating arrangement 3 by third parties. If this is not the case, the vehicle 2 remains locked. Furthermore, enabling is activated or can be activated by the user only when it is recorded by means of a camera 8 that a trunk 9 of the vehicle 2 that is depicted in more detail in FIGS. 2 to 4 and in which the vehicle seat arrangement 3 is in the folded-in state, is free of other objects, for example objects forgotten by the authorized vehicle user. Alternatively, or additionally, a confirmation can also be carried out by the authorized vehicle user, for example via the application program of the mobile terminal 6, that the trunk 9 is free of objects. If there is no confirmation that the trunk 9 is free of objects, the vehicle 2 remains locked.

The third party can control an opening of the trunk 9 of the parked vehicle 2 and an operation, in particular the folding in and out of the seating arrangement 3, by means of the application program of the mobile terminal 7. Here, it is ensured that it can only carried out by register users, for example with an account in the application program including validated address data, while this is logged in the application program.

In a possible design, locations of vehicles 2 having a vehicle seating arrangement 3 that can be operated by third persons by means of the application program and is ready for operation and can be folded out are emitted by means of the application program on the mobile terminal 7. This emission is carried out, for example, in a map image.

Furthermore, in a possible design, each operation of the vehicle seat arrangement 3 carried out by a third person is stored together with a corresponding geographical position of the vehicle 2 present at the point in time of operation in a central memory unit 10, which is a component of a central data processing unit 11, for example a so-called backend server.

Furthermore, it is provided in a possible design that, when the third party is removed from a predetermined perimeter around the vehicle 2 without folding the seating arrangement 3 in advance, an alarm is emitted on the mobile terminal 7 of the third party by means of the application program and, if the third party does not react, the vehicle seating arrangement 3 is automatically folded back in.

FIGS. 2 to 4 show a semi-transparent side view of a cut-out of a vehicle 2 with a seat arrangement 3 that can be folded out in the vehicle 2 in different positions.

The vehicle 2 is formed as a saloon car, and the seating arrangement 3 is arranged in a trunk 9 of the vehicle 2 and inside this can be transferred from a folded-in position into a folded-out position.

The seating arrangement 3 comprises a leaning element 3.1 and two seating elements 3.2, 3.3 arranged on the leaning element 3.1. Here, a first seating element 3.2 is arranged fixedly on the leaning element 3.1 and a second seating element pivotably on the first seating element 3.2.

In the folded-in state of the seating arrangement 3 depicted in FIG. 2, the leaning element 3.1 is arranged at least substantially in parallel to and below an inner wall not depicted in more detail and delimiting the trunk 9 on an upper side. In the folded-in state of the seating arrangement 3, the seating elements 3.2, 3.3 are arranged on one another and run substantially perpendicularly to the leaning element 3.1 and in parallel to an inner wall not depicted in more detail and delimiting the trunk on a vehicle cell.

To fold out the seating arrangement 3, a trunk cover 12 is automatically opened and, as depicted in FIG. 3, the leaning element 3.1 is automatically shifted together with the seating elements 3.2, 3.3 in the direction of a vehicle tail.

Finally, the leaning element 3.1 and the second seating element 3.3 are pivoted downwards into a folded-out state in such a way that the seating arrangement 3 is arranged according to the depiction in FIG. 4. Here, the leaning element 3.1 in the folded-out state runs at least substantially in parallel to a vertical axis Z of the vehicle inside the trunk 9, and the seating elements 3.2, 3.3 run starting from a lower end of the folded-out leaning element 3.1 at least up to a loading edge of the trunk 9 and at least substantially perpendicularly to the vertical axis Z of the vehicle.

In the folded-out state, the vehicle 2, in particular a parked saloon car, can thus offer a relaxation possibility in the form of a seating possibility "similar to a park bench" below a trunk lid 12 offering shade, without the actual interior chamber of the vehicle having to be available and open.

In a possible design of the vehicle 2, its seating arrangement 3 that can be folded out can be operated by means of a device 1 according to FIG. 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device for operating a seating arrangement that can be folded out of or into a vehicle, the device comprising:
    a control unit configured to receive and execute an activation command by an authorized vehicle user or a third party to fold the seating arrangement out of a region inside the vehicle into a region accessible from outside the vehicle.

2. The device of claim 1, further comprising:
    at least one electronic vehicle key comprising a configured to enable an operation of the seating arrangement by third parties, or
    at least one mobile terminal comprising an application program configured to enable the operation of the seating arrangement by the third party.

3. The device of claim 1, further comprising:
    at least one mobile terminal, comprising an application program configured to operate the seating arrangement by the third party.

4. A method for operating a seating arrangement that can be folded out of or into a vehicle, the method comprising:
    enabling, by an authorized user of the vehicle, a folding-out function of the seating arrangement for use by a third party; and
    executing the folding-out function of the seating arrangement from a region inside the vehicle into a region accessible from outside the vehicle.

5. The method of claim 4, wherein approval of the folding-out function is only activated or is only activatable when a camera records or the authorized user confirms that a trunk, in which the seating arrangement is in the folded-in state, is free of other objects.

6. The method of claim 4, further comprising:
    emitting, by an application program on a mobile terminal of a third party, locations of vehicles comprising a seating arrangement that can be operated by third parties by the application program and that are ready for operation and can be folded out.

7. The method of claim 4, further comprising:
    saving, in a central storage unit of the vehicle together with a corresponding geographical position of the vehicle present at a point in time of operation of the seating arrangement, each operation of the seating arrangement performed by a third party.

8. The method of claim 6, further comprising:
    emitting an alarm by the mobile terminal of the third party when the third party is no longer within a predetermined perimeter around the vehicle without previously folding in the seating arrangement; and
    automatically folding-in the seating arrangement if the third party does not react to the emitted alarm by folding-in the seating arrangement.

9. A vehicle, comprising:
    a seating arrangement that is foldable out of or into a trunk of the vehicle, wherein
    the seating arrangement comprises at least one leaning element and at least one seating element arranged on the leaning element,
    the at least one leaning element in a folded-in state of the seating arrangement runs parallel to and below an inner wall delimiting the trunk on an upper side of the trunk,
    the at least one seating element in the folded-in state of the seating arrangement runs parallel to an inner wall delimiting the trunk from a passenger compartment,
    the at least one leaning element and the at least one seating element are pivotable out of the folded-in state into a folded-out state,
    the at least one leaning element in the folded-out state runs parallel to a vertical axis of the vehicle inside the trunk, and
    the at least one seating element in the folded out state runs, starting from a lower end of the folded-out leaning element at least up to a loading edge of the trunk, perpendicularly to a vertical axis of the vehicle.

10. The vehicle of claim 9, further comprising:
    device for operating the seating arrangement, wherein the device comprises a control unit configured to receive and execute an activation command by an authorized vehicle user or a third party to fold the seating arrangement out of the trunk into a region accessible from outside the vehicle.

* * * * *